United States Patent
Kondo et al.

(10) Patent No.: US 6,178,266 B1
(45) Date of Patent: Jan. 23, 2001

(54) METHOD AND APPARATUS FOR THE RECOVERY OF COMPRESSION CONSTANTS IN THE ENCODED DOMAIN

(75) Inventors: Tetsujiro Kondo, Kanagawa (JP); James J. Carrig; Sugata Ghosal, both of San Jose, CA (US); Kohji Ohta, Tokyo (JP); Yasuhiro Fujimori, Cupertino, CA (US); Yasuaki Takahashi; Hideo Nakaya, both of Kanagawa (JP)

(73) Assignees: Sony Corporation, Tokyo (JP); Sony Electronics, Inc., Park Ridge, NJ (US)

( * ) Notice: Under 35 U.S.C. 154(b), the term of this patent shall be extended for 0 days.

(21) Appl. No.: 09/250,032

(22) Filed: Feb. 12, 1999

(51) Int. Cl.[7] ...................................................... G06K 9/00

(52) U.S. Cl. ............................................ 382/239; 382/235

(58) Field of Search .................................. 382/232, 233, 382/235, 236, 238, 239, 244, 248, 250, 251, 252, 253; 358/133, 135, 136, 138, 112

(56) References Cited

U.S. PATENT DOCUMENTS

| | | |
|---|---|---|
| 3,311,879 | 3/1967 | Daher . |
| 3,805,232 | 4/1974 | Allen . |
| 4,361,853 | 11/1982 | Remy et al. . |
| 4,381,519 | 4/1983 | Wilkinson et al. ................. 358/21 R |
| 4,419,693 | 12/1983 | Wilkinson et al. .................... 358/167 |
| 4,574,393 * | 3/1986 | Blackwell et al. ...................... 382/17 |
| 4,703,351 | 10/1987 | Kondo .................................. 358/135 |
| 4,703,352 | 10/1987 | Kondo .................................. 358/135 |
| 4,710,811 | 12/1987 | Kondo .................................. 358/135 |
| 4,722,003 | 1/1988 | Kondo .................................. 358/135 |
| 4,729,021 | 3/1988 | Kondo . |
| 4,772,947 | 9/1988 | Kono ................................... 358/135 |

(List continued on next page.)

FOREIGN PATENT DOCUMENTS

| | | | |
|---|---|---|---|
| 0 527 611 | 8/1992 | (EP) | ................................ H04N/9/80 |
| 0 558 016 | 2/1993 | (EP) | ................................ H04N/7/133 |
| 0 566 412 A2 | 4/1993 | (EP) . | |
| 0 592 196 A2 | 10/1993 | (EP) . | |
| 0 596 826 | 11/1993 | (EP) | ................................ H04N/5/92 |
| 0 605 209 A2 | 12/1993 | (EP) . | |
| 0 610 587 | 12/1993 | (EP) . | |
| 0 680 209 | 4/1995 | (EP) | ................................ H04N/5/91 |
| 0 833 517 | 4/1998 | (EP) | ................................ H04N/7/30 |
| 7-67028 | 3/1995 | (JP) | ................................ H04N/5/235 |
| WO96/07987 | 9/1995 | (WO) . | |

OTHER PUBLICATIONS

Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.

(List continued on next page.)

Primary Examiner—Bijan Tadayon
Assistant Examiner—Seyed Azarian
(74) Attorney, Agent, or Firm—Blakely, Sokoloff, Taylor & Zafman LLP (57) ABSTRACT

The system and method of the present invention provides an innovative technique for recovering lost or damaged (lost/damaged) compression constants in the encoded domain. In one embodiment, a lost/damaged compression constant is recovered by determining at least one candidate compression constant, adjusting encoded data to a common scale, scoring the candidate compression constant using the adjusted encoded data and selecting the candidate compression constant with the best score as the recovered compression constant.

61 Claims, 5 Drawing Sheets

U.S. PATENT DOCUMENTS

| | | | |
|---|---|---|---|
| 4,788,589 | 11/1988 | Kondo | 358/133 |
| 4,815,078 | 3/1989 | Shimura | 370/30 |
| 4,845,560 | 7/1989 | Kondo et al. | 358/133 |
| 4,890,161 * | 12/1989 | Kondo | 358/135 |
| 4,924,310 | 5/1990 | Von Brandt | 358/136 |
| 4,953,023 | 8/1990 | Kondo | 358/135 |
| 4,975,915 | 12/1990 | Sako et al. | |
| 5,023,710 | 6/1991 | Kondo et al. | 358/133 |
| 5,122,873 | 6/1992 | Golin | |
| 5,142,537 | 8/1992 | Kutner et al. | 371/31 |
| 5,159,452 | 10/1992 | Kinoshita et al. | 358/141 |
| 5,196,931 | 3/1993 | Kondo | 358/133 |
| 5,208,816 | 5/1993 | Seshardi et al. | 371/43 |
| 5,237,424 | 8/1993 | Nishino et al. | 358/310 |
| 5,241,381 * | 8/1993 | Kondo | 358/133 |
| 5,243,428 | 9/1993 | Challapali et al. | |
| 5,258,835 | 11/1993 | Kato | 358/135 |
| 5,327,502 | 7/1994 | Katata et al. | 382/56 |
| 5,359,694 | 10/1994 | Concordel | 358/445 |
| 5,379,072 | 1/1995 | Kondo | 348/441 |
| 5,398,078 | 3/1995 | Masuda et al. | 348/699 |
| 5,416,651 | 5/1995 | Uetake et al. | 360/48 |
| 5,416,847 | 5/1995 | Boze | |
| 5,428,403 | 6/1995 | Andrew et al. | 348/699 |
| 5,434,716 | 7/1995 | Sugiyama et al. | 360/32 |
| 5,438,369 | 8/1995 | Citta et al. | 348/470 |
| 5,446,456 | 8/1995 | Seo | |
| 5,455,629 | 10/1995 | Sun et al. | |
| 5,469,216 | 11/1995 | Takahashi et al. | 348/441 |
| 5,471,501 | 11/1995 | Parr et al. | 375/354 |
| 5,481,554 | 1/1996 | Kondo | 371/53 |
| 5,481,627 | 1/1996 | Kim | 382/254 |
| 5,495,298 | 2/1996 | Uchida et al. | |
| 5,552,608 | 9/1996 | Shimizume | 371/40.3 |
| 5,594,807 * | 1/1997 | Liu | 382/128 |
| 5,598,214 | 1/1997 | Kondo et al. | 348/414 |
| 5,617,333 | 4/1997 | Oyamada et al. | |
| 5,625,715 | 4/1997 | Trew et al. | 382/236 |
| 5,636,316 | 6/1997 | Oku et al. | |
| 5,663,764 | 9/1997 | Kondo et al. | 348/414 |
| 5,689,302 | 11/1997 | Jones | |
| 5,703,889 | 12/1997 | Shimoda et al. | 371/55 |
| 5,737,022 | 4/1998 | Yamaguchi et al. | |
| 5,751,361 | 5/1998 | Kim | |
| 5,751,743 | 5/1998 | Takizawa | 371/41 |
| 5,790,195 | 8/1998 | Ohsawa | |
| 5,796,786 | 8/1998 | Lee | 375/326 |
| 5,805,762 | 9/1998 | Boyce et al. | 386/68 |
| 5,852,470 | 12/1998 | Kondo et al. | 348/448 |
| 5,861,922 | 1/1999 | Murashita et al. | |
| 5,878,183 | 3/1999 | Sugiyama et al. | |
| 5,903,481 | 5/1999 | Kondo et al. | |
| 5,936,674 | 8/1999 | Kim | |
| 5,946,044 | 8/1999 | Kondo et al. | |

OTHER PUBLICATIONS

Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
Jeng, et al., "Concealment Of Bit Error And Cell Loss In Inter–Frame Coded Video Transmission", 1991 IEEE, 17.4.1–17.4.5.
Monet, et al., "Block Adaptive Quantization Of Images", IEEE 1993, pp. 303–306.
International Search Report PCT/US00/03738, Feb. 11, 2000, 9 pgs.
Stammnitz, et al., *"Digital HDTV Experimental System"*, pp. 535–542.
NHK Laboratories Note, "Error Correction, Concealment and Shuffling", No. 424, Mar. 1994, pp. 29–44.
Translation of Japanese Patent #7–67028, 30 pgs.
Kondo, et al., "Adaptive Dynamic Range Coding Scheme for Future Consumer Digital VTR", pp. 219–226.
Kim, et al., "Bit Rate Reduction Algorithm for a Digital VCR", IEEE Transactions on Consumer Electronics, vol. 37, No.3, Aug. 1, 1992, pp. 267–274.
Kondon, et al., "Adaptive Dynamic Range Coding Scheme for Future HDTV Digital VTR", Fourth International Workshop on HDTV and Beyond, Sep. 4–6, Turin, Italy.
Kondo, et al., "A New Concealment Method for Digital VCR's", IEEE Visual Signal Processing and Communication, pp. 20–22, Sep. 1993, Melbourne, Australia.
Park, et al., "A Simple Concealment for ATM Bursty Cell Loss", IEEE Transactions on Consumer Electronics, No. 3, Aug. 1993, pp. 704–709.
Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.
R. C. Gonzalez, et al., "Digital Image Processing", Addison Wesley Publishing Company, Inc., 1992, pp. 346–348.
R. Aravind, et al., "Image and Video Coding Standards", AT&T Technical Journal, Jan./Feb. 1993, pp. 67–88.
Zhu, et al., "Coding and Cell–Loss Recovery in DCT–Based Packet Video", IEEE Transactions on Circuits and Systems for Video Technology, Jun. 3, 1993, No. 3, NY.
International Search Report, PCT/US98/22347, Mar. 16, 1999, 2pgs.
International Search Report, PCT/US95/22531, Apr. 1, 1999, 1pg.
International Search Report, PCT/US98/22411, Feb. 25, 1999, 1 pg.
International Search Report, PCT/US98/22412, Oct. 5, 1999, 5 pgs.

* cited by examiner

ADRC BLOCK

ADRC BLOCK

FIG. 3a

BLOCK 2

+

BLOCK 1

=

IMAGE PORTION

METHOD AND APPARATUS FOR THE RECOVERY OF COMPRESSION CONSTANTS IN THE ENCODED DOMAIN

BACKGROUND OF THE INVENTION

1. Field of the Invention

The present invention relates to the recovery of data. More particularly, the present invention relates to the recovery of lost/damaged compression constants in a bitstream of compressed data.

2. Art Background

It is often desirable to compress data, such as video images or sound data, for transmission and storage. Typically, when data is compressed, compression constants are generated. These constants are transmitted or stored along with the compressed image. Problems can arise if the compression constants are lost or damaged prior to decompression of the data. As an illustration, the discussion below illustrates the problems that arise if image data compression constants are lost.

The discrete data points that make up a digital image are known as pixels. Typically, each pixel is represented independently using 8 bits, but other representations also are used for the purposes of compression or analysis. Most of the alternative representations begin by dividing this raw data into disjoint sets. For historical reasons, these sets are referred to as "blocks", even though they may not have a traditional block shape. The alternative representation then characterizes the data by some block-wide information and per-pixel information.

Examples of block-wide information include the minimum pixel value (MIN), the maximum pixel value (MAX), and the dynamic range of the pixel values (DR). Per-pixel information may indicate where the pixel value lies within the range specified by the global information. For compression to be achieved, the per-pixel information must use only a few bits of storage so that the total number of bits used is less than that required to store the raw image.

In one example, the block data is comprised of the MIN, DR and Qbit number (defined below), and the pixel data is comprised of Q codes. A Q code is an integer in the range $[0, 2^Q-1]$ that identifies one value in the set $\{MIN, MIN+1, \ldots, MAX\}$. Since the Qbit number is generally small and the DR value may be relatively large, it is generally not possible to represent all pixel values exactly. Therefore, some quantization error is introduced when pixel values are reduced to Q code values. For instance, if the Qbit number is 3, then it is generally possible to represent $2^3=8$ values from the set $\{MIN, MIN+1, \ldots, MAX\}$ without any error. Pixels with other values are rounded to one of these eight values. This rounding introduces quantization error.

Temporal compression is feasible for a sequence of like images spanning more than one instance in time. An image frame is defined as the 2-dimensional collection of pixels arising within a given time period. It is well known that data from corresponding locations of temporally close image frames is likely to contain similar values. When this is true, compression is improved by encoding each of these like values only once.

In a second example, multiple image frames are encoded by adding a motion flag (MF) to the block information of the first example. This MF indicates whether or not data from each frame is encoded using separate Q codes. If no motion is indicated, the same Q codes are used to represent each frame of data. If motion is indicated, then separate Q codes are used to encode each frame.

If any of the block information is lost, the damage to the image is potentially large since many pixels are affected. For this reason, it is desirable to have techniques for estimating the values of this lost data. For example, if the MF value is damaged, there are two possible interpretations of the input bitstream. One interpretation expects the same Q codes to be used for both frames, and the second interpretation expects the frames to use different Q codes. If the wrong interpretation is chosen, then all the pixels in the block are potentially damaged. Even worse, all the pixels in subsequent blocks could be damaged since the decoder has lost its place in the bitstream. For this reason it is important to have a highly accurate recovery method.

Recovery methods fall into two categories: decoded domain, and encoded domain. Decoded domain techniques restore portions of the image to its raw data format and then exploit local correlation properties to estimate the missing data. Data recovery, including recovery of compression constants, may be performed in the decoded domain. However, additional computation and time, and therefore additional expense, is required to perform and evaluate decodings.

SUMMARY OF THE INVENTION

The system and method of the present invention provides an innovative technique for recovering lost or damaged (lost/damaged) compression constants in the encoded domain. In one embodiment, a lost/damaged compression constant is recovered by determining at least one candidate compression constant, adjusting encoded data to a common scale, scoring the candidate compression constant using the adjusted encoded data, and selecting the candidate compression constant with the best score as the recovered compression constant. In one embodiment, the encoded data is adjusted by the addition of an offset. Furthermore, in another embodiment, the encoded data may have been randomized prior to the function which caused data loss (e.g., transmission/storage of the encoded data); therefore a derandomization process may be applied to the data. In another embodiment, a plurality of blocks may be processed wherein the scoring is performed across a plurality of blocks.

BRIEF DESCRIPTION OF THE DRAWINGS

The objects, features and advantages of the present invention will be apparent from the following detailed description in which.

DETAILED DESCRIPTION

In the following description, for purposes of explanation, numerous details are set forth in order to provide a thorough understanding of the present invention. However, it will be apparent to one skilled in the art the these specific details are not required in order to practice the present invention. In other instances, well known electrical structures and circuits are shown in block diagram form in order not to obscure the present invention unnecessarily.

The following is described in the context of Adaptive Dynamic Range Coding (ADRC) encoded images, and more particularly to the recovery of lost or damaged (lost/damaged) motion flag (MF) and/or Qbit values. However, it is contemplated that the present invention is not limited to ADRC encoding and the particular compression constants generated; rather it will be apparent that the present invention is applicable to different compression technologies and different types of data, including, but not limited to, sound data and the like.

Figure 1A:
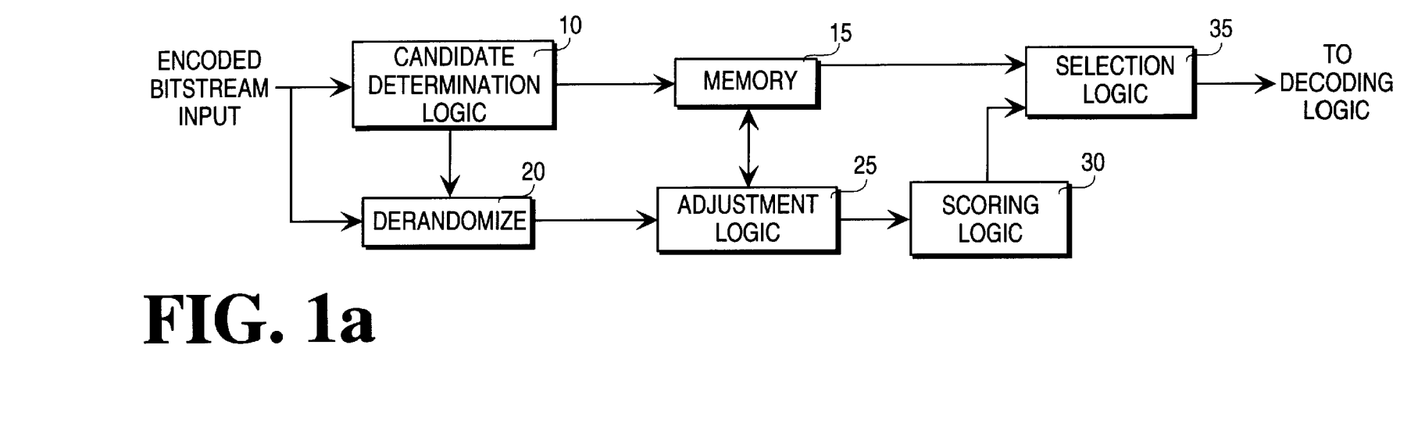
FIG. 1a illustrates one embodiment of the system of the present invention.
Figure 1B:
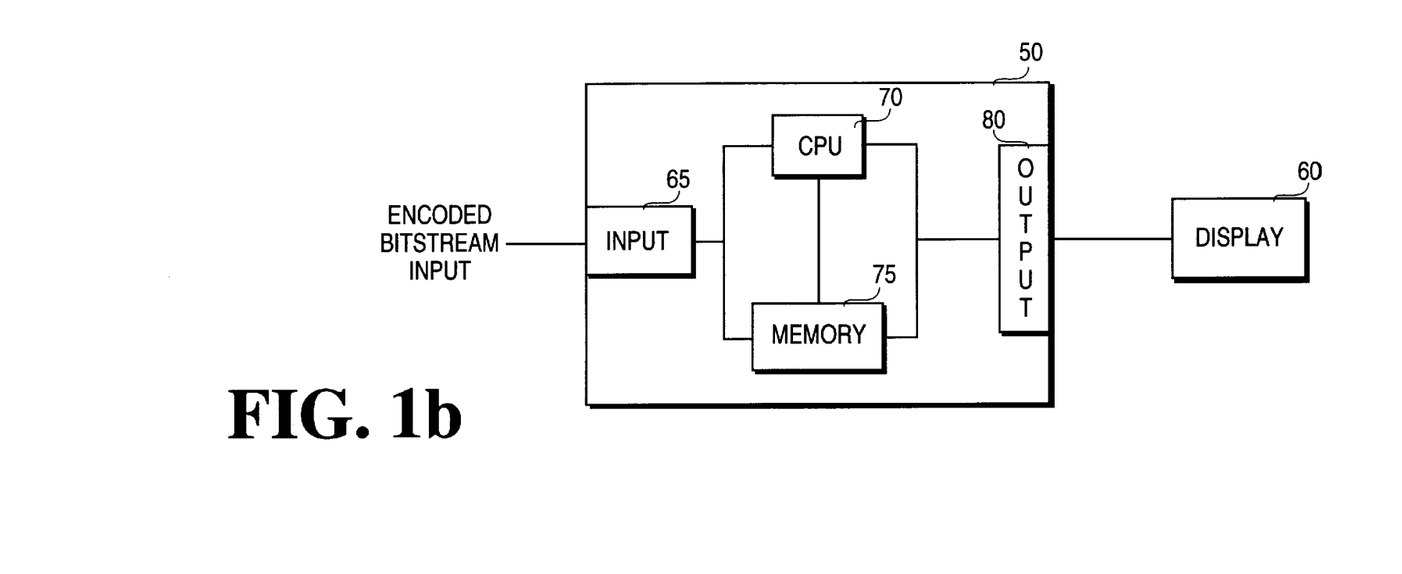
FIG. 1b illustrates another embodiment of the system of the present invention.

One embodiment of the system of the present invention is illustrated in FIG. 1a. FIG. 1a is a simplified functional block diagram of circuitry that may be utilized to implement the processes described herein. For example, the circuitry may be implemented in specially configured logic, such as large scale integration (LSI) logic or programmable gate arrays. Alternately, as is illustrated in FIG. 1b, the circuitry may be implemented in code executed by a specially configured or general purpose processor, which executes instructions stored in a memory or other storage device or transmitted across a transmission medium. Furthermore, the present invention may be implemented as a combination of the above.

Referring to FIG. 1a, candidate determination logic 10, generates at least one possible candidate of the lost or damaged (lost/damaged) compression constant and corresponding candidate encoded data using the candidate compression constant. In one embodiment, the candidate data are stored in memory 15; alternately, the candidate data are not stored, but are simply output by candidate determination logic 10 to adjustment logic 25.

Derandomization logic 20 is optionally included to derandomize encoded data that had been randomized at the time the data was encoded As will be explained more fully below, this optional process provides more information for candidate selection as incorrect candidates will tend to score very poorly and correct candidates score significantly.

Adjustment logic 25, adjusts the encoded data of a neighboring block and candidate encoded data determined using the candidate compression constant to a common scale.

The adjusted encoded data are input to scoring logic 30 which determines a score, for example, based upon correlation of neighboring data. In one embodiment, encoded data from a neighboring block is used to determine correlation. Other embodiments of correlation may also be used.

Selection logic 35 selects the best scoring candidate as the recovered compression constant. The output of selection logic 35 is then used to decode the encoded data. The process of decoding the encoded data using the compression constants varies according the encoding process used an will not be discussed in detail herein. However, the decoding process may similarly be implemented in specially configured or programmable logic by a processor.

FIG. 1a is illustrative of logic utilized to process the candidate decodings serially. In another embodiment, sufficient logic and memory is provided to process the candidate decodings in parallel. Furthermore, other embodiments are also contemplated which include logic and memory for performing processes across multiple blocks. This will be described in more detail below.

An alternate embodiment of the circuit for recovering lost/damaged compression constants is shown in FIG. 1b. The methods described herein can be implemented on a specially configured or general purpose processor. Instructions are stored in the memory 75 and accessed by the processor 70 to perform many of the steps described herein. An input 65 receives the input bitstream and forwards the data to the processor 70 and the output 80 outputs data.

In one embodiment, the output may consist of the decoded data, such as image data decoded once the compression constant is recovered, sufficient to drive an external device such as display 60. In another embodiment, the output 80 outputs the selected candidate decoding. The recovered compression constant is then processed by processor 70 or input to other circuitry (not shown) to generate the decoded data.

Figure 2:
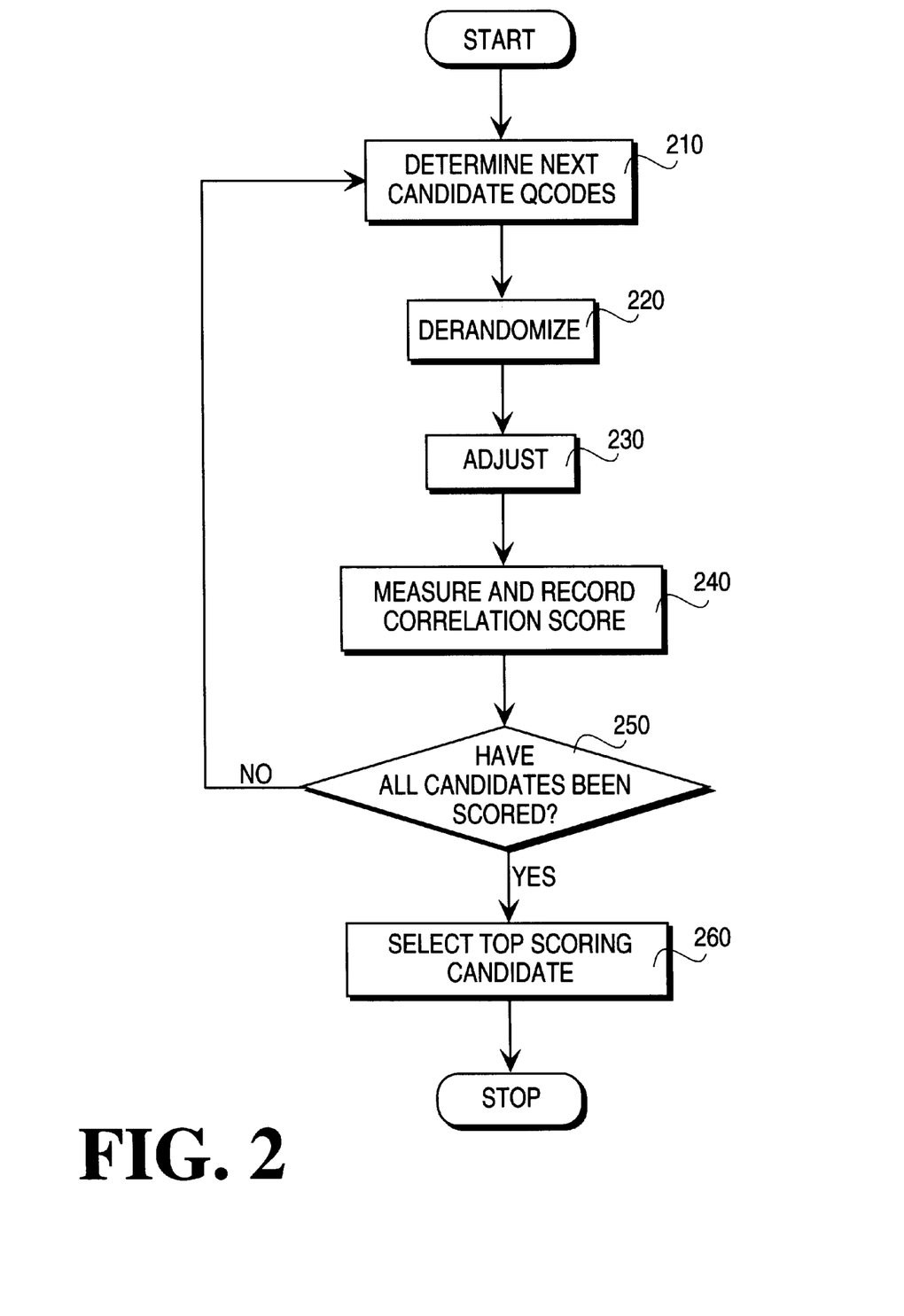
FIG. 2 illustrates one embodiment of the method of the present invention.

FIG. 2 is illustrative of one embodiment of a method for recover of lost/damaged compression constants in accordance with the teachings of the present invention. At step 210, the candidate compression constants and corresponding candidate encodings are determined. In one embodiment, candidate encodings are accessed from the bitstream in accordance with a particular candidate compression constant. The candidate encodings for each candidate decoding can be determined serially, as is shown in FIG. 2. Alternately the candidate data for all candidate decodings can be determined in one step at the beginning of the process. In the present embodiment, candidate MF or Qbit values (depending upon the constant to be recovered) are used to identify the corresponding Q codes from the bitstream (referred to herein as candidate Q codes).

Optionally, a derandomization process, step 220, is applied to the candidate Q codes determined in step 210. Derandomization will be applied if the original data was randomized at the time of encoding. The randomization pattern is chosen based on the values for the compression constants.

Randomization may be applied to destroy the correlation of incorrect candidate decodings. The randomization process does not change the properties of the correct candidate, as it is restored to its original condition. In particular, by utilizing randomization across multiple blocks, subsequent derandomized data will tend to result in candidate decodings that exhibit highly correlated properties indicative that a good candidate decoding is selected, or highly uncorrelated properties indicative that the corresponding candidate decoding is not a good selection. The randomization process is chosen such that a correct derandomization results in a candidate decoding exhibiting highly correlated properties and an incorrect derandomization results in a decoding exhibiting uncorrelated properties. Encoding parameters may be used to perform the randomization and derandomization processors.

In one embodiment, randomization is achieved using a code reallocation process. In one embodiment, reallocation is performed using a masking key. Thus, during the encoding process, a key, referred to herein as KEY, is used to mask a bitstream of Q codes. KEY may be used to mask a bitstream of Q codes corresponding to three blocks of data. Each key element ($d_i$) of the masking key is generated by the combination of certain compression constants, used to encode a corresponding block of data.

For example, in one embodiment, the MF and Qbit values are used to define KEY. Alternately, the masking key is generated from DR and MIN values. More particularly, for 4 bit ADRC encoding which uses MF and Qbit values to generate KEY, the value of the key elements composing KEY are determined in accordance with the following equation:

$$d_i = 5 \cdot m_i + q_i$$

where i=0, 1, 2
and $q_i$ represents the number of quantization bits; $q_i$=0, 1, 2, 3, 4 and $m_i$ represents the motion flag (MF) value, for example, 0 for a stationary block and 1 for a motion block.

Continuing with the present example, if KEY is generated using three blocks, KEY is formed according to the following:

$$KEY = d_0 + 10 \cdot d_1 + 100 \cdot d_2$$

Figure 3A:
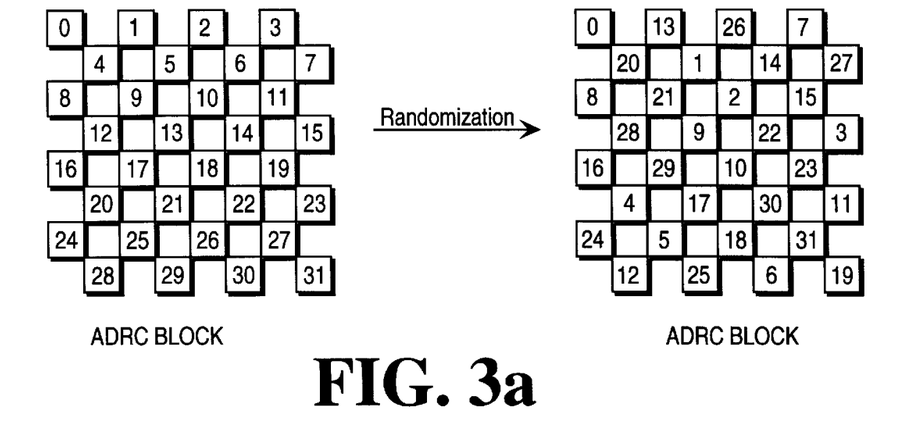
FIG. 3a illustrates one embodiment of randomization.

The result of the process is a randomization of Q codes, for example, as shown in FIG. 3a.

It therefore follows that during recovery of MF or Qbit data, a bit derandomization process is performed in which possible KEY values are regenerated depending upon the values used to create the masking keys. The regenerated KEY values are used to unmask the received bitstream of Q codes resulting in candidate encoded data. Thus, if the MF or Qbit value used to generate the mask is not correct, the corresponding Q codes will exhibit a low level of correlation, which will be typically readily detectable.

Figure 3B:
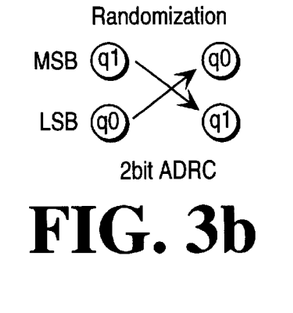
FIGS. 3b, 3c and 3d illustrate alternate embodiments of a randomization process.
Figure 3C:
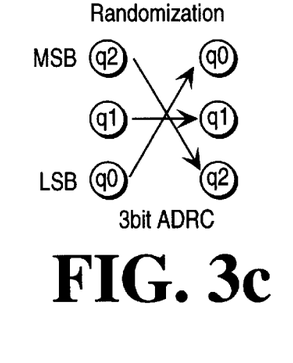
Figure 3D:
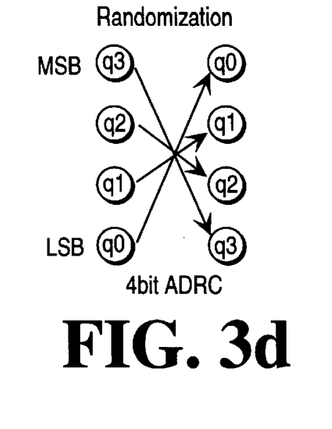

In another embodiment, a randomization process, referred to herein as bit reallocation, is applied to the data. In one embodiment, bit reallocation is achieved by simple bit weight inversion. The inversion pattern is determined according to the number of bits used for encoding (e.g., Qbit). This randomization process can improve recovery of MF and Qbit values. Examples are shown in FIGS. 3b, 3c and 3d. FIG. 3b illustrates a bit reallocation process for 2 bit encoding, FIG. 3c illustrates a bit reallocation process for a 3 bit encoding and FIG. 3d illustrates a bit reallocation process for a 4 bit encoding.

In another embodiment, the randomization process can be performed individually or together. For example, the bit reallocation process can be applied to the data followed by application of the code reallocation process to the bit reallocated data.

Referring back to FIG. 2, at step 230, the candidate Q codes of the block and the Q codes of a neighboring block having undamaged compression constants are adjusted to a common scale. This overcomes the problems that may arise if the two blocks have different Qbit values such that the Q codes of the two blocks may not correspond to the same relative quantization levels. The adjustment process recalibrates the Q codes to common levels for comparison.

Figure 4:
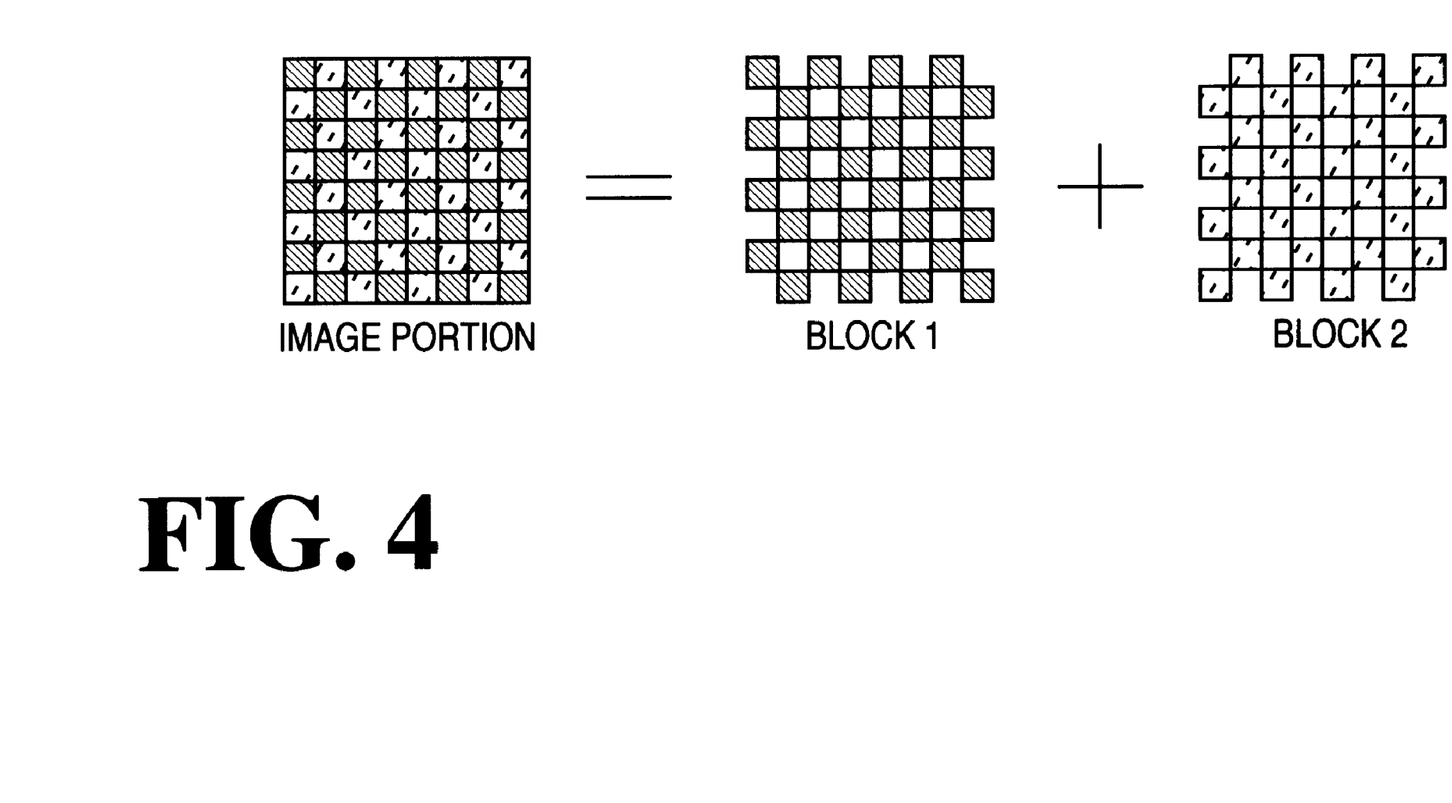
FIG. 4 illustrates an example of complementary blocks of data.

The problem this step of the process addresses may be better understood by reference to FIG. 4. FIG. 4 illustrates two blocks that originate from overlapping areas of an image portion; it is reasonable to assume that these two blocks have similar DR and MIN values. If the two blocks have similar DR and MIN values, a natural correspondence arises between the Q codes of the first block and the Q codes of the second block. This correspondence is better evaluated by mapping to a common scale.

Figure 5:
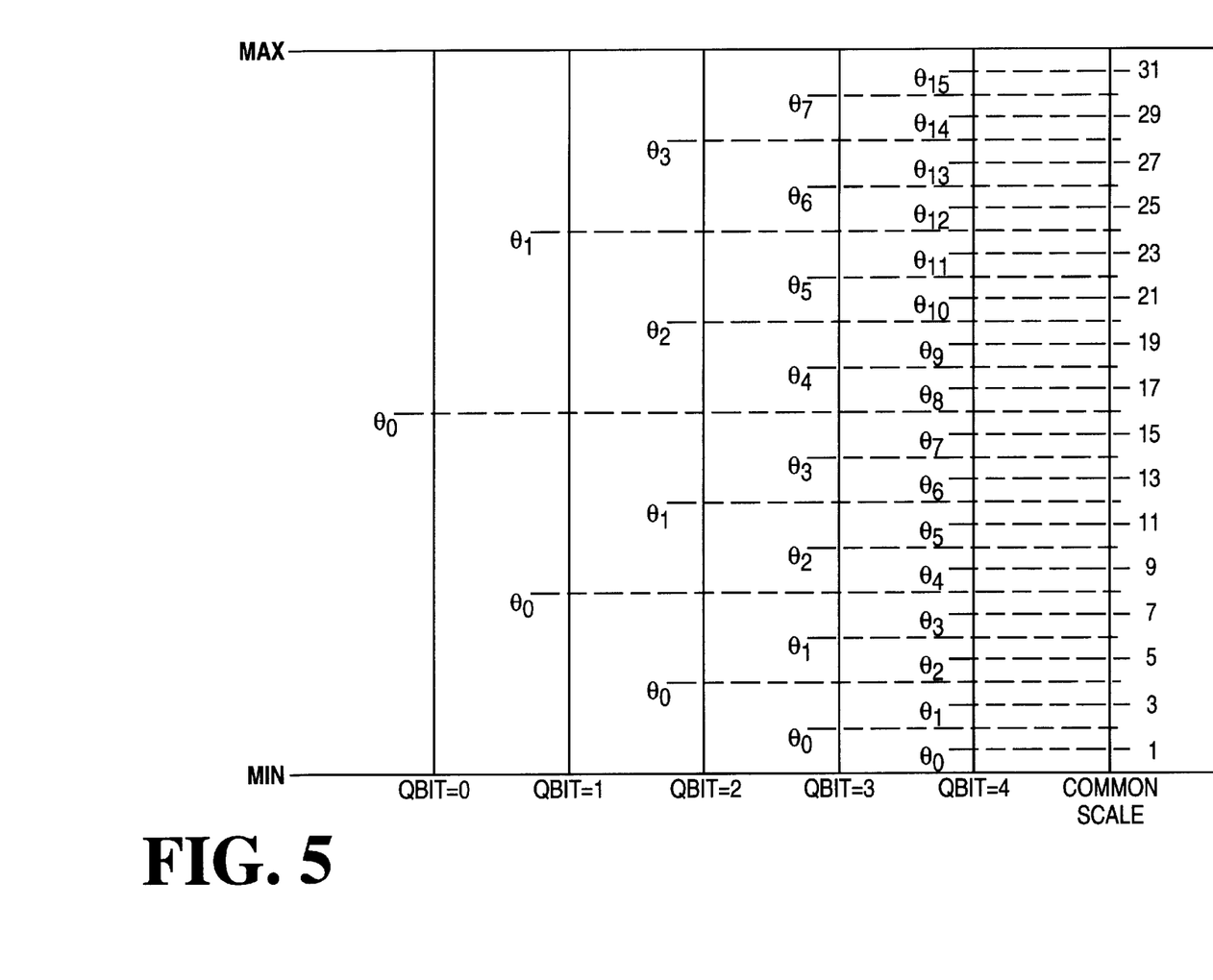
FIG. 5 illustrates an example of adjustment of encoded data to a common scale.

In one embodiment, if the Qbit number Q is taken from the set {0,1 ... 4}, uniform quantization levels are used and all Q codes are adjusted to the range as shown in FIG. 5.

Thus one possible adjustment is performed according to the following:

$$q_{adj} = \mathrm{adj}(e) = 2^{5-Q} \cdot e + 2^{4-Q}$$

where e represents the original Q code value, $q_{adj}$ represents the adjusted Q code value and Q represents the Qbit number.

Alternately, a more general approach can be taken by assuming that the DR values are the same and to adjust for possible differences in MIN values. Thus, continuing with the above example, the adjusted Q codes of the first block, e.g., the candidate encoded values, would remain in the range of 0–32, but the adjusted Q codes of the second block, e.g., encoded value of a neighboring block, would be in the range [o, 32+o] where o represents an offset.

If both the MIN values are known, then the adjustment is simply the difference between MIN values. However, the MIN values may not be known and therefore it is preferable to estimate the difference. One such estimation is the difference in average adjusted Q code values for the two blocks, determined as:

$$o = \overline{q1} - \overline{q2}$$

where o represents the offset, $\overline{q1}$ is the average of adjusted Q code values from the first block and $\overline{q2}$ is the average of adjusted Q code values from the second block. Alternately, $\overline{q1}$ and $\overline{q2}$ may respectively represent the mean or median or some other function of adjusted Q code values from the first block and second block. In one embodiment, the average is taken over all the Q codes in a block. In another embodiment, a weighted average is computed wherein a Q code is counted once for each boundary it shares with a pixel from the other, i.e.., complementary, block. In addition, if some Q codes are lost/damaged, those Q codes may be omitted form the average calculation.

Using the offset, the adjusted Q codes may be defined as:

$$a1 = \mathrm{adj}(e1)$$

$$a2 = \mathrm{adj}(e2) + o$$

where a1 represents the adjusted value of a Q code value from the first block, and a2 represents the adjusted value of a Q code value from the second block, and adj(e1),adj(e2) represents adjusted Q code values for the first block and the second block and correspond to the equation adj(e) defined above. In addition, if the constant term $2^{4-Q}$ is omitted from the above equation, then it will be absorbed into the constant o in the subsequent equation. This leads to a more streamlined equation. In an alternate embodiment, o might be defined as an approximation of the average difference. For example, $$o = \frac{1}{N} \cdot \sum_{i \in I} (q_i - q'_i)$$

where the index set I counts over to the set of usable neighboring relation and N is approximately the number of elements in I. This approximation may be used to reduce the complexity of the computation of o.

At step 240 in FIG. 2, the score for each candidate is measured and may be stored. The score is a measure indicative of local correlation. The most highly correlated candidate is the most likely candidate. A variety of measures can be used, including horizontal correlation, vertical correlation, smoothness and spatial activity. In addition, a measure of correlation may include absolute difference or linear error. The absolute difference is determined by calculating the total absolute difference of adjacent Q codes of adjacent blocks.

In one embodiment, the absolute difference is determined according to the following:

$$AE = \sum_{i \in I} |a_i - a_i'|$$

where AE represents the absolute difference measure, $a_i$ represents the adjusted Q code value of the i-th Q code of the first block and $a_i'$ represents the adjusted Q code value of the i-th Q code of the second block. A small AE value indicates a high degree of local correlation. Conversely, a large AE value indicates a lack of local correlation. Therefore, the candidate with the smallest absolute error is the most likely candidate.

The AE of the correct decoding is a fixed number. The AE of the other candidates, however, depends on how the bitstream is read. As noted earlier, the randomization/derandomization processes (e.g., step 220) assist in the determination of the correct candidate. By randomizing the bitstream during the encoding process using the correct Qbit and MF values, the AE subsequently determined during decoding can be raised so that the distinction between the correct candidate and incorrect candidates is clear. In particular, derandomization using incorrect candidates will result in random Q codes rendering typically a large AE compared to the AE corresponding to the correct candidate.

In an alternate embodiment, the randomization and therefore subsequent derandomization processes can be extended to multiple, e.g., three, blocks. If a single randomization sequence is applied to a bitstream composed of a group of encoded blocks, then either all the Q codes arising from these blocks will be correctly decoded or none of these Q codes will be correctly decoded. This all-or-none approach can be used to improve the performance of the decoder. Since there are multiple blocks on which to base the decision of which candidate is correct, the probability of making an incorrect decision may be quite small. However, if more than one damaged Qbit or MF value exists in the group of blocks, the number of candidates is multiplicative, therefore increasing the amount of computation required. One way to process is to sum the AE measurements from each block in the group. The candidate corresponding to the smallest sum may then be selected as the proper decoding.

In another embodiment in which a block having a damaged Qbit or MF flag value is adjacent to multiple neighboring blocks, the process can be extended to use the correlation information with respect to multiple neighboring blocks. In this embodiment, an offset is determined for each neighboring block relative to the encoded block to compensate for that block's MIN and/or DR value. Correlation can then be determined using the above described equations wherein the set of usable neighboring values includes values from more than one neighboring block.

Although the present invention is discussed with respect to image data, the present invention may be used with any form of correlated data, including without limitation photographs or other two-dimensional static images, holograms, or other three-dimensional static images, video or other two-dimensional moving images, three-dimensional moving images, a monaural sound stream, or sound separated into a number of spatially related streams, such as stereo.

The invention has been described in conjunction with the preferred embodiment. It is evident that numerous alternatives, modifications, variations and uses will be apparent to those skilled in the art in light of foregoing description.

What is claimed is:

1. A method for recovery of lost compression constants of encoded data, said method comprising the steps of:
    determining a plurality of candidate compression constants;
    accessing candidate encoded data corresponding to each candidate compression constant;
    adjusting candidate encoded data and neighboring encoded data to a common scale;
    scoring at least one candidate compression constant using the adjusted encoded data; and
    selecting as the compression constant the candidate compression constant corresponding to the best score.

2. The method as set forth in claim 1, wherein the step of determining uses candidate compression constants in the range of allowable values.

3. The method as set forth in claim 1, wherein the step of determining uses candidate compression constants in the range of allow quantization bit numbers.

4. The method as set forth in claim 1, wherein the encoded data is generated by ADRC encoding.

5. The method as set forth in claim 1, wherein the encoded data is selected from the group consisting of image data and sound data.

6. The method as set forth in claim 1, wherein the step of accessing uses candidate compression constants that correspond to a number of bits remaining to decode.

7. The method as set forth in claim 1, wherein at least one of the candidate encoded data and neighboring encoded data are adjusted by an addition of an offset.

8. The method as set forth in claim 7, wherein the offset is determined according to the following equation:

$$o = ave(q_i) - ave(q_i')$$

where o represents the offset, $q_i$ represents candidate encoded data, $q_i'$ represents neighboring encoded data and ave represents a function selected from the group of average, mean and median functions.

9. The method of claim 7, wherein the offset is determined from the candidate encoded data and neighboring encoded data.

10. The method as set forth in claim 7, wherein the offset is determined as an approximation of an average difference between candidate encoded data and neighboring encoded data.

11. The method as set forth in claim 7, wherein the offset is determined according to the following equation:

$$o = \frac{1}{N} \cdot \sum_{i \in I} (q_i - q_i')$$

where o represents the offset, N represents an approximation of the number of elements in the set I of usable neighboring encoded data, $q_i$ represents candidate encoded data, and $q_i'$ represents neighboring encoded data.

12. The method as set forth in claim 1, wherein the step of scoring comprises the step of determining a measure of correlation.

13. The method as set forth in claim 12, wherein the encoded data comprises image data and the measure is related to local image correlation.

14. The method as set forth in claim 12, wherein the measure of correlation is determined from a difference function between candidate encoded data and neighboring encoded data.

15. The method as set forth in claim 12, wherein the measure is determined according to the following equation:

$$AE = \sum_{i \in I} |a_i - a_i'|$$

where AE represents an absolute error measure related to local image correlation, $a_i$ represents the adjusted Q code value of the candidate encoded data, and $a_i'$ represents the adjusted Q code value of the neighboring encoded data and I represents a set of usable neighboring encoded data.

16. The method as set forth in claim 1, wherein the encoded data is randomized, said method further comprising the step of derandomizing randomized encoded data.

17. The method as set forth in claim 16, wherein the step of derandomizing comprises the steps of:
using at least one candidate compression constant to define a randomization pattern; and
derandomizing the randomized encoded data using the randomization pattern.

18. The method as set forth in claim 16, wherein the step of derandomizing comprises the step of performing a bit reallocation process the randomized encoded data.

19. The method as set forth in claim 16, wherein the encoded data comprises a plurality of blocks, and said step of performing derandomized is applied to the plurality of blocks.

20. The method as set forth in claim 1, wherein the step of scoring at least one candidate compression constant is performed in parallel for each of a plurality of candidate compression constants.

21. The method as set forth in claim 1, wherein the neighboring encoded data comprises a plurality of blocks, said step of scoring comprises the step of determining a measure of a level of correlation across the plurality of blocks.

22. A system for recovering lost compression constants of encoded data comprising:
an input configured to received the encoded data;
candidate logic configured to determine a plurality of candidate compression constants and corresponding candidate encoded data;
adder logic configured to adjust the candidate encoded data and neighboring encoded data to a common scale;
scoring logic configured to score the candidate compression constant using the adjusted encoded data;
select logic configured to select as the compression constant the candidate compression constant corresponding to the best score.

23. The system as set forth in claim 22, wherein the candidate logic, adder logic, scoring logic and select logic is configured in at least one ASIC.

24. The system as set forth in claim 22, wherein the candidate logic, adder logic, scoring logic and select logic is configured in at least one large scale integration (LSI) component.

25. The system as set forth in claim 22, wherein at least one of the candidate encoded data and neighboring encoded data are adjusted by addition of an offset.

26. The system as set forth in claim 22, wherein the encoded data is selected from the group consisting of image data and sound data.

27. The system as set forth in claim 22, wherein the candidate logic uses candidate compression constants in the range of allowable quantization bit numbers.

28. The system as set forth in claim 22, wherein the encoded data is generated by ADRC encoding.

29. The system as set forth in claim 25, wherein the offset is determined according to the following equation:

$$o = ave(q_i) - ave(q_i')$$

where o represents the offset, $q_i$ represents candidate encoded data, $q_i'$ represents neighboring encoded data and ave represents an average function selected from the group of average, mean and median functions.

30. The system of claim 25, wherein the offset is determined from the encoded data and neighboring encoded data.

31. The system as set forth in claim 25, wherein the offset is determined as an approximation of an average difference between encode data and neighboring encoded data.

32. The system as set forth in claim 25, wherein the offset is determined according to the following equation:

$$o = \frac{1}{N} \cdot \sum_{i \in I} (q_i - q_i')$$

where o represents the offset, N represents an approximation of the number of elements in the set of I of usable neighboring encoded data, $q_i$ represents encoded data, and $q_i'$ represents neighboring encoded data.

33. The system as set forth in claim 22, wherein the scoring logic is configured to determine a measure of correlation.

34. The system as set forth in claim 33, wherein the encoded data comprises image data and the measure is related to local image correlation.

35. The system as set forth in claim 33, wherein the measure of correlation is determined from a difference function between encoded data and neighboring encoded data.

36. The system as set forth in claim 33, wherein the measure is determined according to the following equation:

$$AE = \sum_{i \in I} |a_i - a_i'|$$

where AE represents an absolute error measure related to local image correlation, $a_i$ represents the adjusted Q code value of the candidate encoded data, and $a_i'$ represents the adjusted Q code value of the neighboring encoded data and I represents a set of usable neighboring encoded data.

37. The system as set forth in claim 22, wherein the encoded data is randomized, said system further comprising derandomization logic configured to derandomized the randomized encoded data.

38. The system as set forth in claim 37, wherein the derandomization logic is configured to use a candidate compression constant to define a randomization pattern and derandomize the randomized encoded data using the randomization pattern.

39. The system as set forth in claim 37, wherein the derandomization logic is configured to perform a bit reallocation to derandomize the randomized encoded data.

40. The system as set forth in claim 37, wherein the encoded data comprises a plurality of blocks, said derandomization logic processing the plurality of blocks.

41. The system as set forth in claim 22, wherein the scoring logic configured to execute parallel processes for each of a plurality of candidate compression constants.

42. The system as set forth in claim 22, wherein the neighboring encoded data comprises a plurality of blocks, and said scoring logic is configured to determine a measure of a level of correlation across the plurality of blocks.

43. The system as set forth in claim 22, wherein a processor comprises the candidate logic, adder logic, scoring logic and select logic.

44. A computer readable medium containing executable instructions, which, when executed in a processing system, causes the system to perform the steps for recovery of lost/damaged compression constants of encoded data, comprising:
   determining a plurality of candidate compression constants;
   accessing candidate encoded data corresponding to each candidate compression constant;
   adjusting candidate encoded data and neighboring encoded data to common scale;
   scoring at least one candidate compression constant using the adjusted encoded data; and
   selecting as the compression constant the candidate compression constant corresponding to the best score.

45. The computer readable medium as set forth in claim 44, wherein the encoded data is selected from the group consisting of image data and sound data.

46. The computer readable medium as set forth in claim 44, wherein the encoded data and neighboring encoded data are adjusted by addition of an offset and the offset is determined according to the following equation:

$$o = ave(q_i) - ave(q_i')$$

where o represents the offset, $q_i$ represents candidate encoded data, $q_i'$ represents neighboring encoded data and ave represents an average function.

47. The computer readable medium as set forth in claim 44, wherein the candidate encoded data and neighboring encoded data are adjusted by addition of an offset and the offset is determined from the candidate encoded data and neighboring encoded data.

48. The computer readable medium as set forth in claim 44, wherein the candidate encoded data and neighboring encoded data are adjusted by addition of an offset and the offset is determined as an approximation of an average difference between candidate encoded data and neighboring encoded data.

49. The computer readable medium as set forth in claim 44, wherein the step of determining uses candidate compression constants in the range of allowable quantization bit numbers.

50. The computer readable medium as set forth in claim 44, wherein the encoded data is generated by ADRC encoding.

51. The computer readable medium as set forth in claim 44, wherein the candidate encoded data and neighboring encoded data are adjusted by addition of an offset and the offset is determined according to the following equation:

$$o = \frac{1}{N} \cdot \sum_{i \in I} (q_i - q_i')$$

where o represents the offset, N represents an approximation of the number of elements in the set I of usable neighboring encoded data, $q_i$ represents candidate encoded data, and $q_i'$ represents neighboring encoded data.

52. The computer readable medium as set forth in claim 44, wherein the scoring is performed by determining a measure of a level of correlation.

53. The computer readable medium as set forth in claim 52, wherein the measure is determined according to the following equation:

$$AE = \sum_{i \in I} |a_i - a_i'|$$

where AE represents an absolute error measure related to local image correlation, $a_i$ represents the adjusted Q code value of the candidate encoder data, and $a_i'$ represents the adjusted Q code value of the neighboring encoded data and I represents a set of usable neighboring encoded data.

54. The computer readable medium as set forth in claim 52, wherein the measure of correlation is determined from a difference function between candidate encoded data and neighboring encoded data.

55. The computer readable medium as set forth in claim 52, wherein the encoded data comprises image data and the measure is related to local image correlation.

56. The computer readable medium as set forth in claim 44, wherein the encoded data is randomized, and further comprising instructions, which when executed, derandomize the randomized encoded data.

57. The computer readable medium as set forth in claim 44, wherein scoring at least one candidate compression constant is performed in parallel for each of a plurality of candidate compression constants.

58. The computer readable medium as set forth in claim 44, wherein the neighboring encoded data comprises a plurality of blocks, and scoring determines a measure of a level of correlation across the plurality of blocks.

59. An apparatus for recovery of lost compression constants of encoded data, said method comprising the steps of:
   means for determining a plurality of candidate compression constants;
   means for accessing candidate encoded data corresponding to each candidate compression constant;
   means for adjusting candidate encoded data and neighboring encoded data to a common scale;
   means for scoring at least one candidate compression constant using the adjusted encoded data; and
   means for selecting as the compression constant the candidate compression constant corresponding to the best score.

60. The apparatus as set forth in claim 59, wherein at least one of the candidate encoded data and neighboring encoded data are adjusted by an addition of an offset.

61. The apparatus as set forth in claim 59, wherein the encoded data is randomized, said apparatus further comprising a means for randomizing the randomized encoded data.

* * * * *